United States Patent [19]
Riggio

[11] Patent Number: 6,003,228
[45] Date of Patent: Dec. 21, 1999

[54] METHOD FOR MAKING A DECORATIVE OR JEWELRY ITEM

[75] Inventor: Richard R. Riggio, Springfield, Pa.

[73] Assignee: Wave Corporation, Wayne, Pa.

[21] Appl. No.: 09/078,689

[22] Filed: May 14, 1998

[51] Int. Cl.⁶ .................................................. B23P 13/00
[52] U.S. Cl. .......................... 29/896.41; 29/896.4; 63/33; 156/59; 428/13; 428/187
[58] Field of Search ............................. 29/896.4, 896.41; 156/59; 63/33; 428/13, 187

[56] References Cited

U.S. PATENT DOCUMENTS

| | | | |
|---|---|---|---|
| 958,641 | 5/1910 | Heeren | 29/896.41 |
| 2,451,913 | 10/1948 | Brice | 428/13 |
| 2,724,919 | 11/1955 | Leyendecker | 428/29 |
| 3,287,193 | 11/1966 | Klein | 156/59 |
| 4,347,270 | 8/1982 | Hart | 428/13 |
| 4,546,019 | 10/1985 | Schneider | 428/13 |
| 5,216,616 | 6/1993 | Masters | 156/59 |

*Primary Examiner*—P. W. Echols
*Attorney, Agent, or Firm*—Seidel, Gonda, Lavorgna & Monaco, PC

[57] ABSTRACT

The invention is a method for making a reverse intaglio decorative or jewelry item and the product made by the method. Any suitable graphical image is scanned into digital memory. The image is changed from two-dimensional to three-dimensional by adding contour to the original image using appropriate graphics software. The contour is scaled for the production of first and second slightly different sizes. Both sized images are converted to a computer numeric control dataset for controlling a milling machine, which cuts the first contour into the underside of a cabochon of stone or crystal and the second contour into a die stamp tool. An insert is die-stamped into metal, said insert having a convex surface that matches the contour of the first contour milled into the cabochon. The insert is painted and mounted into the cabochon to form the reverse intaglio. Suitable inserts may also be produced by molding and casting rather than machining methods.

19 Claims, 11 Drawing Sheets

METHOD FOR MAKING A DECORATIVE OR JEWELRY ITEM

FIELD OF THE INVENTION

The present invention relates to the production of novelty decorative and jewelry items; and, specifically, relates to a method for making such items.

BACKGROUND OF THE INVENTION

A rare and expensive jewelry item known as a reverse intaglio crystal usually comprises a hand-carved and hand-painted glass or crystal set in a precious metal bezel or ring. An "intaglio" has a recessed figure cut in stone or some other hard substance so that the figure is hollowed out in three dimensions. In a reverse intaglio, the figure is cut into the reverse side of the stone.

In the finished reverse intaglio item produced by the method of the present invention, a three-dimensional image of something of interest, such as an animal, a house, or a tree, is visible through the face of the stone, creating the accurate visual impression that the image is actually within, not under, the stone. In a reverse intaglio made by traditional methods, the hand-carving and hand-painting is done in reverse (that is, on the underside of the stone) using a technique known as "eglomise." An image is carved in three dimensions into the underside of a small glass, crystal or precious stone cabochon. The image is then painted in reverse inside the cabochon. The paint is applied to the carved surface of the recess within the cabochon. The image is seen through the face (top) of the crystal.

It is as if a scene was painted on the inside of a window for viewing from the outside, which is precisely what the French word "eglomise" historically defined. In a reverse intaglio, the fact that the image is carved into the underside of the stone in three dimensions before painting is what conveys the correct visual impression that the scene actually resides within the stone.

Reverse intaglios have been relatively rare and expensive because they have been made entirely by hand. They are often quite small, about the size of a U.S. dime, requiring extreme precision in the acts of cutting and painting in order to produce a visually pleasing product. Painting an image in reverse, particularly on a small, three dimensional surface, is a developed and relatively rare skill. In order for reverse intaglios to become more widely available and affordable, a way had to be found to make the intaglios more efficiently without sacrificing the intricate three-dimensional carving and painting detail and the traditional high-quality character of the image within the stone.

SUMMARY OF THE INVENTION

The present invention is a method for producing reverse intaglio decorative and jewelry items with precision, repeatability, high quality and efficiency. The method uses an improved technique for the production of reverse intaglios, in which the stone cabochon is still cut in reverse on its underside, but the image is not painted on the cut interior surface in reverse. Instead, an insert is produced having exactly the size and shape necessary to fit precisely into the recess cut in the stone; that is, the insert is a three-dimensional physical match for the carved image. The insert is painted with the image to be seen through the stone. There is no need to paint in reverse; the paint is applied on the surface of the insert to be viewed directly through the face of the stone. Then the insert is secured within the carved recess in the cabochon and the cabochon set in an appropriate jewelry setting.

The entire process proceeds from a single image. A suitable graphic image of a desired object (e.g., an animal, an auto, a boat, a tennis racquet, a mountain scene) is scanned into the memory of a computer. The image may take the form of a photograph, a print of an original painting, a graphic design or other such representation of an object or scene. The scanned image is transferred into a Computer Aided Design/Computer Aided Manufacturing (CADCAM) program, where it can be sized, edited and saved to a storage medium. The CADCAM image is outlined and the outline saved to a storage medium. A computer artist, using graphics tools on a computer system, changes the image from a two-dimensional image to a three dimensional image by generating a three-dimensional profile for the object. The three-dimensional profile, comprising topical contour lines to represent changes in the surface detail of the image, is also saved to a storage medium.

A second three-dimensional image is created and saved to a storage medium. This image is a specific percentage larger or smaller than the original three dimensional image to achieve the physical size offset necessary to make both "male" and "female" parts to be joined together later. Two computer numerical control (CNC) toolpaths for a computer-controlled milling machine are generated. A toolpath is a series of three-dimensional coordinates which comprise the instructions for operating a computer-driven milling machine. One toolpath controls the milling machine as it mills out the female reproduction of the three-dimensional image in crystal; the second toolpath controls the milling of a smaller female recess of the same image in steel.

The female image is milled into a cabochon (an uncut polished block) of glass, lead crystal, semi-precious stone or other largely transparent substance. The cabochon is mounted in a fixture and fitted securely to the cutting surface of the computer operated milling machine. The milling machine cuts the female image into the flat, backside of the cabochon.

Milled cabochons that are of high quality may undergo a finishing process during which the milled image is polished by hand using a series of diamond grit pastes of increasingly fine mesh, leaving a clear polished finish on the milled surface of the glass, crystal or stone cabochon.

A metal insert to be assembled into the machined recess in the cabochon is fabricated from a die stamp. A smaller female recess is milled into a soft steel die. The milling machine, controlled by the computer numerical central toolpath sequence generated in software, cuts away appropriate portions of the die to leave the smaller female image machined into a recess on the die. The soft steel die is then hardened by a heat treatment process so that it may be used in a press. A sterling silver disk is placed in the press and die-struck into the smaller female recess die, leaving a convex male relief image impressed in the silver surrounded by a flashing that is removed using a cut stamp tool.

The metal insert may be made by an alternative process. Using molding and casting techniques, a mold of the recess in the cabochon can be made and metal inserts produced by slush casting. A male relief of the machined recess in the cabochon results from the casting process. The male relief has a convex surface that is an accurate match for the recess milled into the cabochon.

The convex, three-dimensional surface of the male relief insert is hand-painted by an artist following the design created by the graphic artist in the beginning of the process. The painted male insert is then fitted into the corresponding female recess in the glass, crystal or stone cabochon such that the painted image is visible through the cabochon and the image's three dimensional character is clearly evident. The insert is secured using a transparent adhesive.

Finally, each cabochon may be mounted in a precious metal housing, such as a bezel, to create a finished jewelry piece. One example of the finished product is an intaglio charm for a charm bracelet. Another example is an intaglio pendant attached to a neck chain. As a decorative item, the intaglio made according to the invention need not be placed in a jewelry setting, but may be mounted in a frame, a display box, a block of wood or marble, or other suitable ornamental material.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DESCRIPTION OF THE INVENTION

The present invention is a method for making a reverse intaglio by simulating the result of eglomise while using modern production techniques. Instead of hand-cutting an image into the underside of a glass/stone cabochon and painting the image in reverse, the method of the present invention incorporates computer imaging and processing, computer-controlled machining, some detailed metalworking, meticulous painting, and careful assembly to create a quantity production process.

The production of the intaglio begins with the selection of an image to be displayed within the cabochon. A "cabochon," for the purposes of this description, is an uncut, polished block of glass, crystal, semi-precious stone or other largely transparent material. The image may be literally anything, though because the intaglio item is often small, the image must be relatively simple to be clearly defined. Some examples are: an animal head (dog, cat, fox, deer), a flower, a building facade, or a religious symbol.

Figure 1:
FIG. 1 is a photograph for reproduction as an image in a reverse intaglio made by the method of the invention.

Referring to FIG. 1, the image 10 that is used for illustration purposes in this description is a dog's head and face. A high-quality image is desirable, having fine detail and excellent color quality. The source of the image may be a photograph, a print of an original painting, a graphic design or other such representation of an object or scene. The image may also be a computer-graphic of any suitable design or subject, in which case the following step of scanning the image into computer memory may be replaced by simply copying the image for further processing.

In the first step of the method, the image is scanned into digital form for processing in a computer. Scanning machines for this purpose are common and no one machine is preferred over another. The scanned image either assumes or may be converted into a convenient format for processing. In the presently preferred method, a bitmap format is used for graphic image processing and storage. Other formats are likely suitable depending on the software package used for scanning and working with graphic images. The scanned image should be a highly accurate representation of the original image 10.

The scanned image is imported into a Computer Aided Design/Computer Aided Manufacturing (CADCAM) program. Ultimately, the CADCAM program will provide the data to generate a toolpath which controls a computer-driven milling machine to cut the cabochon. In this early stage, the scanned image must be processed for correct sizing and adding a three-dimensional contour profile.

In the presently preferred method, the CADCAM program employed is Artcam 1.0 (from Delcam International), which includes a three-dimensional computer numerical control (CNC) capability for generating CNC command data. Other CADCAM packages may be used, provided that they either have a built-in CNC capability or can be interfaced with another software package that generates CNC control sequences from the CADCAM product.

After scanning, the scanned image is cleaned up on the computer. Extraneous dots, lines or splotches are removed, leaving no contaminating markings on the image. This basic image is stored on a suitable storage medium (for example, floppy or hard disk, or tape) for later reference. Most images being color images, the cleaned up scanned image is the reference for the application of paint colors to the metal insert component of the intaglio produced by this method. It also serves as a baseline image that a computer graphic artist will use to generate a three-dimensional contour of the image. The initial image is stored as a CADCAM file type.

Once the reference image is stored, it can be recalled for processing. The image must be sized to the actual size of the image to be reproduced in the finished intaglio. A typical CADCAM program will provide means for designating the finished size of the image while allowing a nearly full-screen work area on the computer. Alternatively, if the CADCAM program supports the option, the image may be processed in larger-than-life size for later scaling to actual size.

It is necessary to create an accurate outline of the scanned image for the fabrication of a cut stamp tool used later in the process. This step is most efficiently accomplished before further processing of the image. An outline of the scanned image is created from the reference image 10 stored in memory. The exact technique for accomplishing the outline task may vary depending on the CADCAM program being used. In the method used by the inventors, an outline of the image may be produced using contour line drawing tools in the CADCAM software. Because the scanned image was stored as a CADCAM file type, a two-operation process is carried out in the preferred method of the invention to obtain a clean outline of the image in bitmap format.

Figure 2:
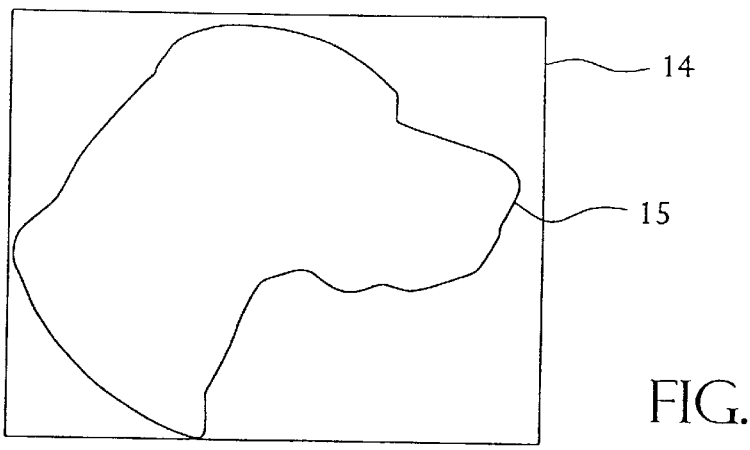
FIG. 2 is an outline of the image.
Figure 3:
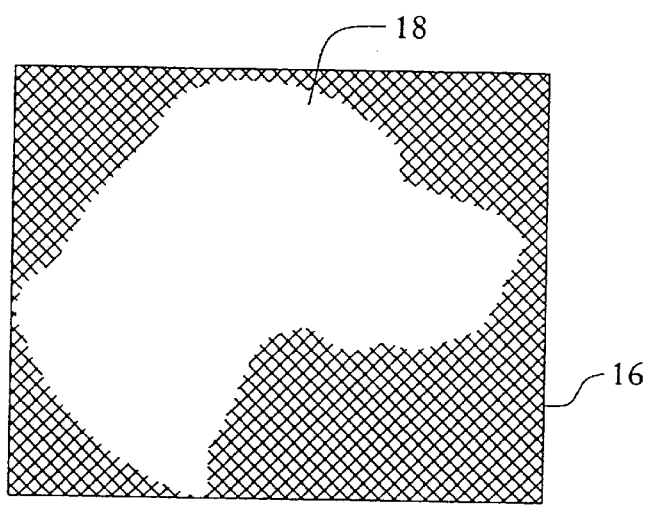
FIG. 3 is a representation of an intermediate stage of processing for the image being reproduced.

In the first operation, Referring to FIG. 2, a line box 14 is placed around the outlined image 15. The line box is "flood filled" with any color that the operator selects, which is referred to herein as "color 1" 16. See FIG. 3. Then the image outline is flood filled with a contrasting color, referred to below as "color 2" 18 (here, white). The line box 14 and the image outline 15, each of which were generated in CADCAM format, are deleted, leaving just the flood filled contrasting colors 1 and 2. See FIG. 3.

Figure 4:
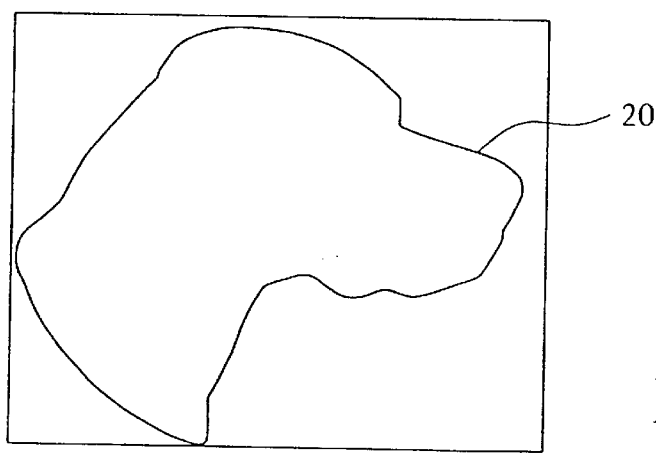
FIG. 4 is an outline of the image within a line box in an intermediate stage of the invention.

In the second operation, using a tool in the CADCAM software, the flood filled color 1 background 16 surrounding the shape of the image is outlined in black at the boundary of color 2 18 and the background color 1 16. Then color 1 is flood filled with color 2 (white), leaving only the box and the outline of the image 20 in bitmap format. See FIG. 4. This image 20 is stored in bitmap format on a suitable storage medium.

The image outline 20 thus generated becomes the reference for the manufacturing of a cut stamp. The cut stamp is needed in a later step to remove the flashing from a die-stamped "male" metal insert that is fitted within the "female" recess that is milled into the reverse side of the cabochon. The bitmap outline 20 is converted, using file conversion software, into a format suitable for manufacturing the cut stamp in a CNC milling operation. In a preferred method, the file format conversion is accomplished using Hijaak Pro Software from Quarterdeck, which converts the bitmap file to AUTOCAD format.

The scanned image 10, stored in CADCAM format, is a two-dimensional depiction of the desired image for the intaglio. To obtain a three-dimensional representation of the image 10, a contour line drawing of the object is produced using the CADCAM software, much like drawing elevation contour lines on a map. The three-dimensional representation of the image is that from which a CNC data set is generated for controlling the milling of the female recess in the reverse side of the cabochon. In the presently preferred method of the invention, the three-dimensional image is generated as follows.

Figure 5:
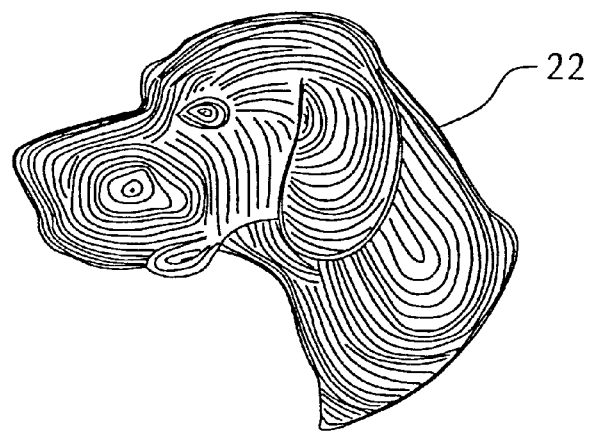
FIG. 5 is a three-dimensional profile of the image.

The CADCAM file stored previously is reopened. This file contains the original cleaned up scanned image 10. Using contour line tools in the CADCAM software, a computer graphic artist generates a three-dimensional contour profile 22 from the two dimensional image. See FIG. 5. The two-dimensional features in the original image serve as landmarks for the artist's location of features in relief. The dimensions of the drawing must be actual size, or must be scalable to actual size in the CADCAM software. This three-dimensional image 22 is saved to a suitable storage medium. The image 22 serves as the source for the "female" recess that will be milled into the cabochon under computer control.

To generate the three-dimensional smaller "female" image for making a die stamp, the original scanned image 10 CADCAM file is reopened. The CADCAM two-dimensional image is resized and another three-dimensional contour line relief is created to be a specific percentage smaller than the original larger female image 22. As more sophisticated software becomes available it may soon be possible to scale the three dimensional image 22 directly, without going back to the two-dimensional image, resizing, then creating a new 3-D image. The new female image must be slightly smaller so that the male insert produced from the new image will fit exactly within the slightly larger female recess to be milled into the cabochon.

It is important to note that the smaller female version of the image is machined as a die stamp. The die stamp is later employed to stamp out the metal inserts for painting and mounting in the cabochon. In the present invention, the smaller female image is sized to be about three (3) percent smaller than the initial female image contour 22.

The two images in contour relief, one for the female recess and one sized to produce the corresponding female die stamp, are the sources for the generation of a CNC toolpath control data set that will guide a CNC milling machine for the fabrication of the cabochon and the die stamp. The die stamp is used to fabricate a male metal insert shaped like the original image. The tools used in the presently preferred method include the CNC engineering capabilities of the Artcam CADCAM software and a software package for controlling a milling machine. The milling machine used in the preferred method is a Servo Products machine, Model 7844-200. The software employed for controlling the Servo machine is "Quick 'n' Easy" by Servo Products Co., Pasadena, Calif.

The original two-dimensional image 10 file is reopened and sized, if necessary, to match the dimensions of the female contour 22. The female contour 22 is then loaded and the two-dimensional and three-dimensional images may be viewed simultaneously to compare for accuracy. Using the CADCAM software, a CNC toolpath data set of three-dimensional coordinates is generated to control the CNC milling machine.

Certain parameters, such as tolerances, tool dimensions and machining methods, may need to be specified before the control toolpath is generated. The tool dimensions and milling tolerances will depend primarily upon the size of the intaglio being fabricated. Very small intaglios, such as the preferred product that is about the size of a U.S. dime, require very small milling tools and tight milling tolerances to obtain a useful and pleasing result. Larger products with larger engravings may permit somewhat less exacting tolerances. The toolpath data generated by the software is assigned a file name and stored on a suitable storage medium.

For milling the cabochon, which is generally softer than steel, a milling tool is used that has abrasive surfaces on the sides as well as the tip. In the preferred method, the milling tool is a 0.325 mm radius diamond-tipped conical tool (325 mesh with 5° side angle). In the software, it is possible to specify stepdown and stepover parameters to regulate the magnitude of each movement of the milling tool when it is cutting material. For machining the cabochons in the preferred method, a 0.025 mm stepover parameter is used because the milling tool cuts on its side, moving laterally, as well as into the glass crystal vertically. The tolerance for each positioning parameter is set at 0.001 mm (1 micrometer) to obtain a highly accurate reproduction of the original image.

For cutting the cabochon, it is also possible to define a "feature" along which the milling tool makes its cutting pass. A feature is one or more contour lines having the same defined machining parameters and, when used where it is practical, permits the machining process to move more quickly.

A similar process is carried out to generate a milling toolpath for making the smaller female recess in the die stamp tool. However, cutting steel is a more exacting machining task than cutting glass or crystal. Because the steel is much harder, it must be cut more gradually to avoid breaking the very small machine tool necessary to achieve fine detail in the recess. In the currently preferred method, the tool size for steel machining is a 0.350 mm radius ball mill. Steel machining must proceed in very fine increments of stepover and stepdown. Stepover and stepdown movement distances vary with each image design used for producing various intaglios, but are usually in a range from 0.005 to 0.020 mm with a 0.001 mm tolerance for all parameters. A safe Z height (vertical movement) for rapid tool moves must be specified, and is usually quite small for steel.

The end result is two CNC toolpath datasets, one for controlling the fabrication of the cabochon having the female three-dimensional image contour milled into it, and the other for controlling the fabrication of a milled female three-dimensional image die stamp.

The next step is to mill the reverse female profile into the cabochon and to make the die stamp that will be used, in one preferred method, to stamp out the metal inserts that are fitted into the cabochon after painting. The milling process in the preferred method is accomplished with a computer-controlled milling machine. The CNC datasets created by the CADCAM software are source data for the software that controls the milling machine.

Figure 6:
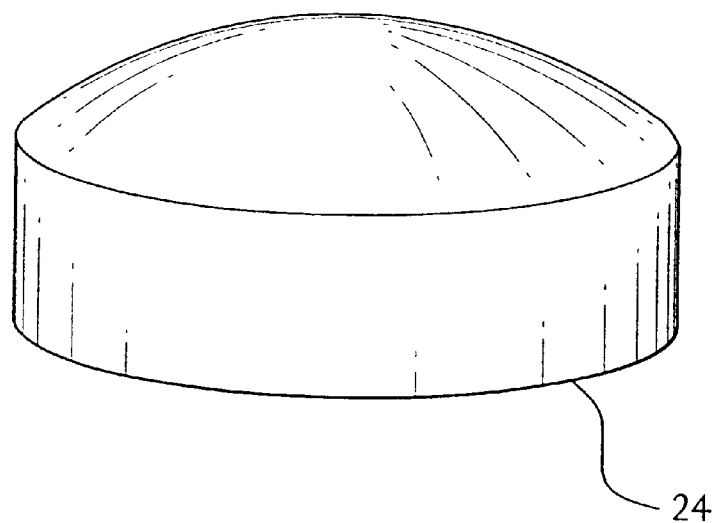
FIG. 6 is a perspective view of a blank cabochon.

In the preferred method described herein, glass, lead crystal or semi-precious stone cabochons are made by a supplier to specifications for size, shape, transparency, hardness and scratch resistance. Cabochons made of other materials may be used provided that they are substantially transparent. An illustration of the cabochon 24 used in the described example is shown in FIG. 6. The cabochon 24 in the described example is small and round, about one-half inch in diameter and less than one-half inch thick. Cabochons of other dimensions may be used, of course. Intaglios may be made in various sizes for use as jewelry and decorative items, ranging from sizes suitable for bracelet charms or necklace pendants, to larger items like framed decorative keepsakes, desk displays and the like.

The cabochon 24 is mounted in a fixture (not shown) to secure it during the milling operation. The flat underside of the cabochon 24 is exposed to the cutting tool and appropriate liquid is provided for cooling and lubrication during the milling process. In the presently preferred method, the liquid is a combination polishing agent and coolant comprised of a cerium oxide slurry and anti-freeze.

The milling machine is adapted for this operation with a high-speed air spindle, which accepts collets of varying sizes to accommodate milling tools having different diameter shanks. For the milling operation on the cabochon 24 in the described example, the spindle is fitted with a conical shaped, diamond-tipped burr of 325 mesh.

The milling machine operator executes the milling software routine controlling the machine, using the CNC toolpath dataset that was created to control milling of the larger female recess. The milling machine cuts away material from the underside of the cabochon 24 under computer control, eventually milling the detailed three-dimensional female image into the stone.

Figure 7:
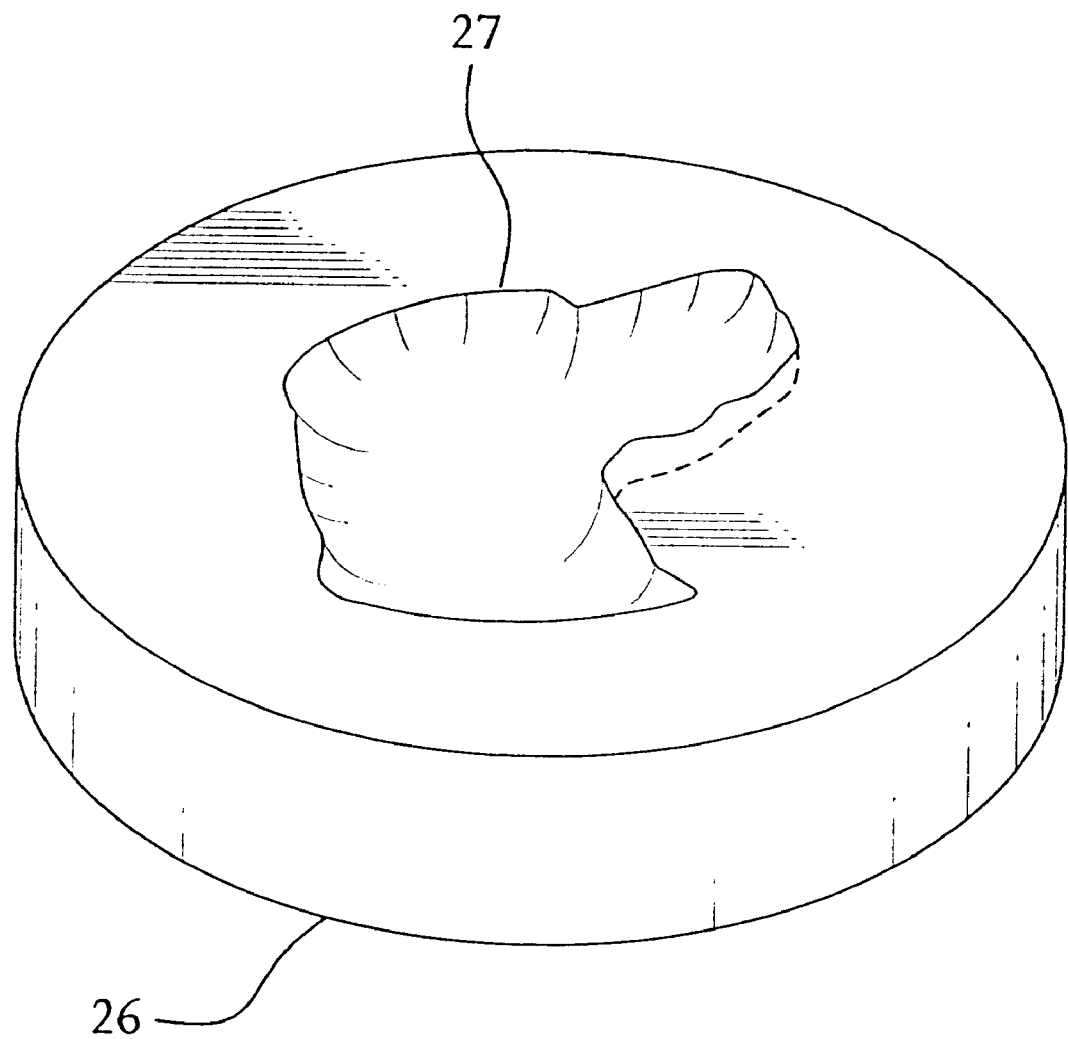
FIG. 7 is a perspective view of a milled cabochon.

Referring to FIG. 7, after the milling operation is complete, the cabochon 26 is removed from the milling machine for cleaning and inspection. If the cabochon milled recess is accurate, of high quality, and sufficiently clean, no further processing is necessary before assembly with the metal insert.

Occasionally, often depending on either the cabochon material or the milling tool used, the milled female recess 27 may have a frosted-glass appearance on the milled surface that, unless polished clear, would obscure the painted surface of the male metal insert when the insert was mated to the cabochon 26. Therefore, milled stones that are of good quality upon inspection may undergo a finishing process. A hand-held variable speed flexible-shaft tool fitted with a phenolic bit is employed to polish the raw milled surface until it is smooth and clear. A series of diamond grit pastes of increasingly finer meshes serve as the polishing medium. Care must be taken to polish the milled surface without damaging the details of the milled image. The clear polished recess surface 27 on the interior of the cabochon may be sprayed with a clear acrylic, if necessary, to put a high luster finish on the surface for maximum transparency.

Figure 8:
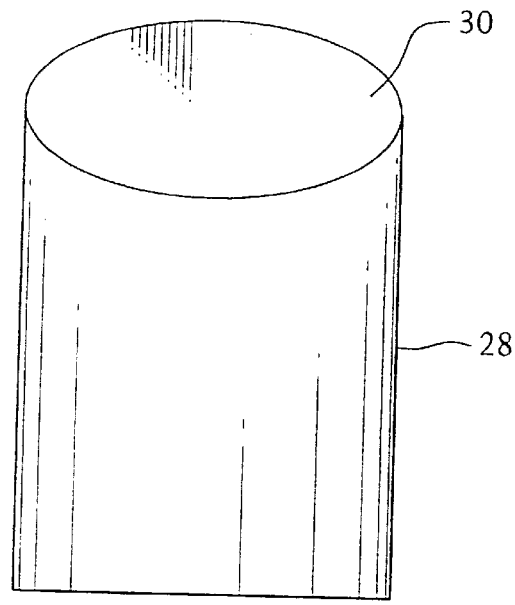
FIG. 8 is a perspective view of a blank steel die before machining.

The male insert is not made directly on the milling machine, but rather the die stamp that is used to stamp the male insert out of blank metal disks is fabricated on the milling machine. Referring to FIG. 8, a cylindrical soft (non-hardened) steel die 28 is secured on the cutting surface of the milling machine with its flat circular end 30 exposed. The exposed end 30 must be large enough to hold the entire recessed figure and leave some room around the edges to serve as a stop for the die stamp tool when it is used in the press.

Figure 9:
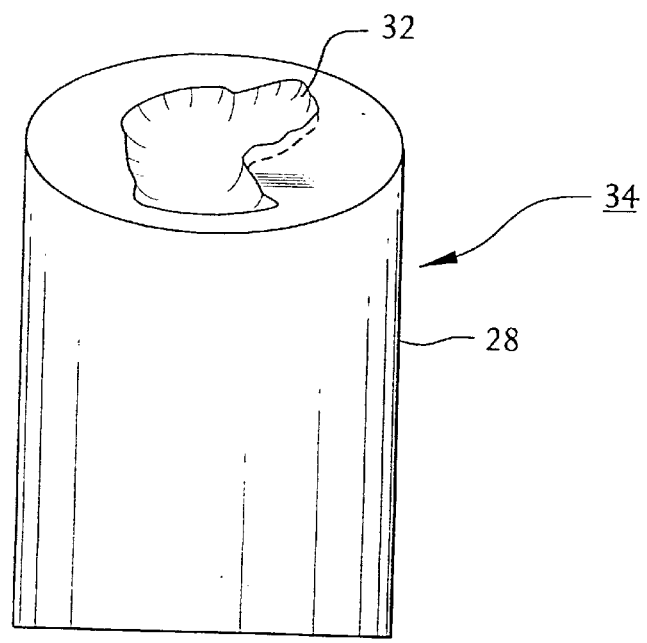
FIG. 9 is a perspective view of a steel die with an image profile milled in recess.

Under computer control, using the CNC toolpath dataset created with the format conversion program, the smaller female recess is milled into the blunt end 30 of the die 28. This operation, like milling the cabochon, cuts a recessed female representation of the original image into the die 28 for impressing the image into metal blanks in a high-pressure press. Metal is cut away from the die 28 until the complete image is formed in a recess 32 on the die 28. See FIG. 9. When the cutting operation is complete, the soft steel die stamp 34 is inspected. If it is of good quality, the die stamp 34 is hardened by conventional heat treatment processes appropriate for the type of steel used.

The die stamp 34 is used to make the male metal inserts that are mated with the cabochon. The hardened steel die stamp 34 is placed in a die set and mounted in a press. Sterling silver metal disk blanks, of a specific weight according to the size of each particular image design, are placed (one at a time) in the press. Each silver disk is then die-struck (or swedged) using about 28 tons of pressure. Under this great pressure, the female image milled into the die is impressed into the silver disk and reproduced with great accuracy and detail.

Silver is preferred for its excellent malleability; it conforms well to the details of the image milled into the die stamp. Other metals are adaptable for the purpose providing that they (a) can conform to the die image under pressure without cracking, splitting or otherwise failing when the image is impressed into them, and (b) do not rust or otherwise oxidize or discolor over time.

Figure 10:
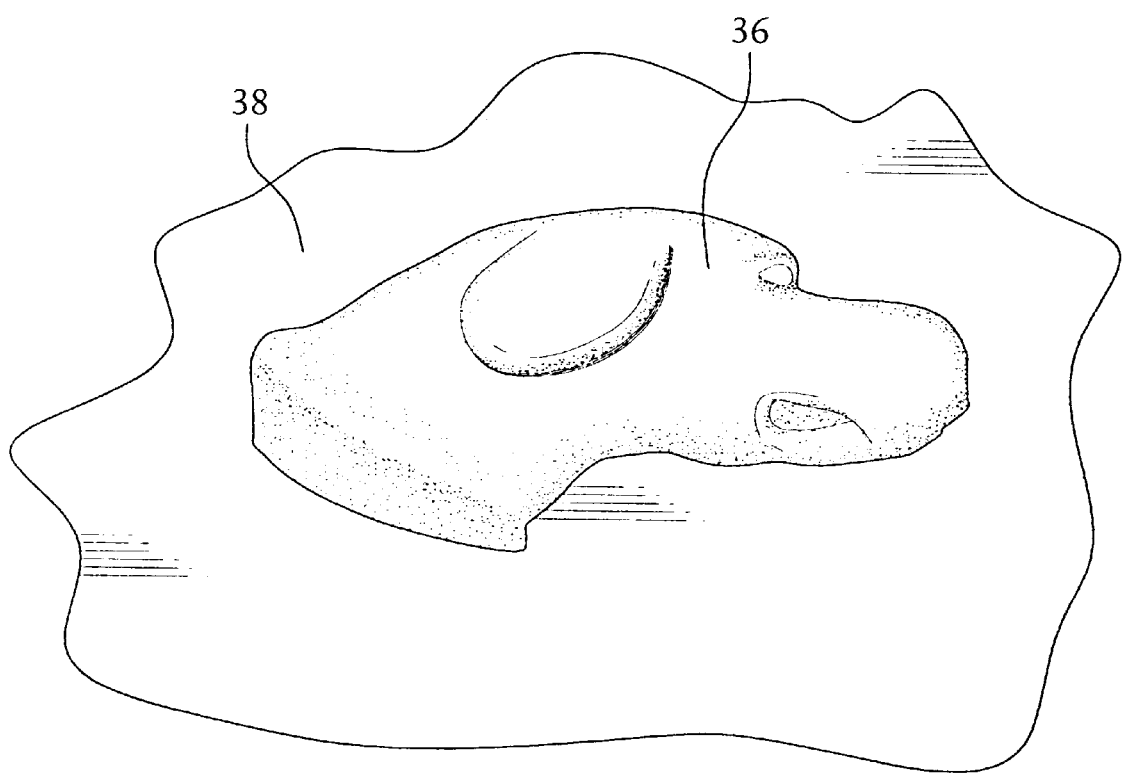
FIG. 10 is a perspective view of a metal insert made according to the method of the invention.

Referring to FIG. 10, after die striking, the silver disks bear a male relief 36 of the image 10 together with a flashing 38 of excess silver surrounding the relief. This flashing 38 must be removed in a precision operation that will not harm the relief 36. For this, another tool, a cut stamp, is necessary.

The cut stamp is fabricated using the box size and image outline 20 previously created by the computer graphic artist and stored. A software package called HiJaak Pro (Quarterdeck Software) converts the bitmap outline drawing to AUTOCAD format to produce a toolpath dataset to control an EDM milling machine.

Figure 11:
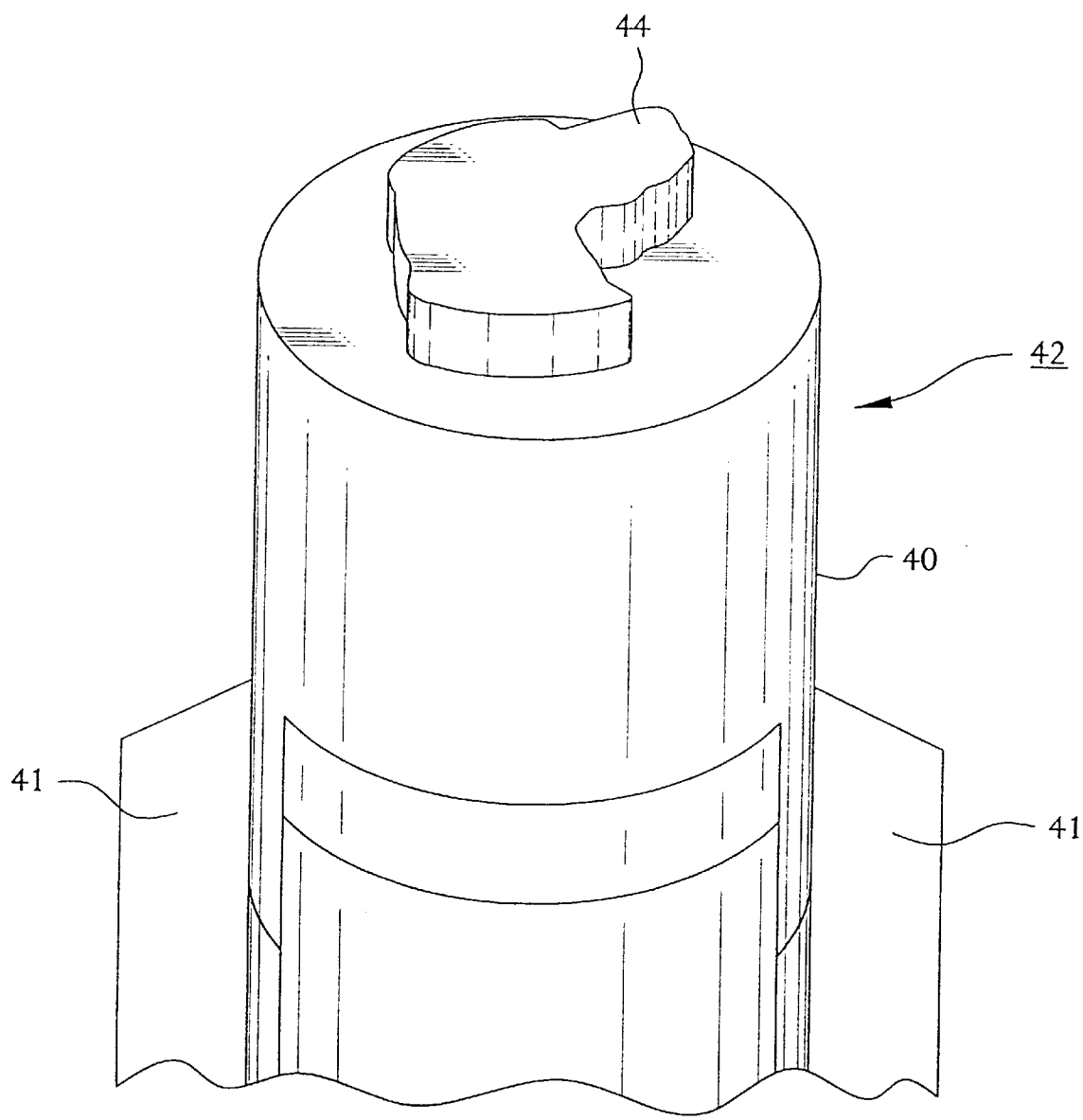
FIG. 11 is a perspective view of the male cut stamp tool made according to the method of the invention.

The EDM process cuts the image into metal blanks. This time, no detailed recess is cut, only the outline of the shape. The cut stamp has both male and female halves, both in the shape of the outlined image 20. In the described method, the cut stamps are designed to be fitted into a one-half ton press. Referring to FIG. 11, a steel tool 40 is fitted into a fixture 41 on the milling machine and the EDM control program is executed for cutting the male cut stamp tool 42. The milling machine removes material from the blank end of the tool, leaving a raised flat male outline of the image 44 on the end of the stamp 42.

Figure 12:
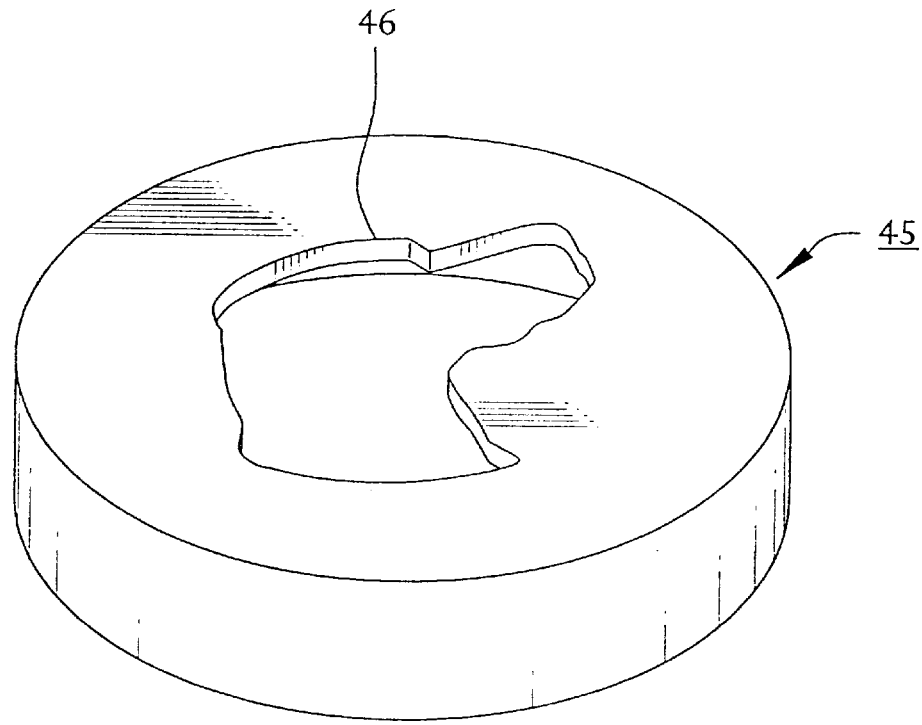
FIG. 12 is a perspective view of the female cut stamp tool made according to the method of the invention.

Referring to FIG. 12, the female half of the tool 45 is made by the same method, except that the EDM machine cuts out material from the blank tool to leave a cutout 46 through the tool end in the shape of the desired image. The female outline cutout 46 is very slightly larger than the male outline cut stamp projection 44.

The male and female cut stamp tools 42, 45 are fitted into a press. Stamped silver male inserts 36 with untrimmed flashing 38 are placed over the flat surface 47 of the female cut stamp tool with the convex image in the stamped inserts projecting into the recessed outline in the female stamp tool. The male cut stamp 42 is pressed through the female tool 45. As the male cut stamp presses through the female image outline, the flashing 38 is cut away from the stamped silver relief of the image, which drops through the female cut stamp tool into a collection area in the press. The trimmed silver reliefs are retrieved from the press and carefully filed to remove any silver burrs around the edges of the relief, readying them for painting and insertion into the cavity machined into the cabochons.

Other processes for fabricating the metal inserts of the image may be employed. For example, the inserts may be cast from a mold created from the original three-dimensional image. The insert castings can be painted and mounted into the milled cabochons to produce intaglios by the methods described herein.

In one example of a second preferred method for making the metal inserts, a molding and casting process is employed. This method eliminates the previous steps of fabricating a die stamp and a cut stamp for making the metal inserts. Instead, jeweler's wax is melted into a cabochon that has the female recessed image cut into it. When cool, the wax surface is trimmed flat to the glass surface and popped out of the cabochon. The wax is itself a replica of the machined recess in the stone, including the fine detail of the original image. The wax replica serves as a master mold for casting a master insert that will be used to fabricate production molds.

By the traditional "lost wax" casting process, a single sterling silver master casting of the image is made. There is very little or no shrinkage in the process, producing a highly accurate reproduction of the three-dimensional image cut into the cabochon, only in reverse. From this original master casting, the figure is remolded and one or more production molds are produced. Then the image may be recast in metal or other suitable substances to produce production versions of the insert that match the recessed image in the cabochon.

In the presently preferred casting method, the production inserts are cast in pewter by slush casting methods well known to those skilled in the art of casting small metal parts, producing as many metal inserts as necessary for assembly of many intaglios. There is a small shrinkage, on the order of about five (5) percent, realized in this process. The resulting metal inserts fit into the female recess milled into the cabochons with a high degree of accuracy, ensuring a good fit. It is possible to make inserts from other than metal material (such as plastics or resins) that are adaptable to the described methods for making reverse intaglios. There may also be variations to the coating method that would produce a suitable insert. All of these variations are within the scope of the present invention.

Figure 13:
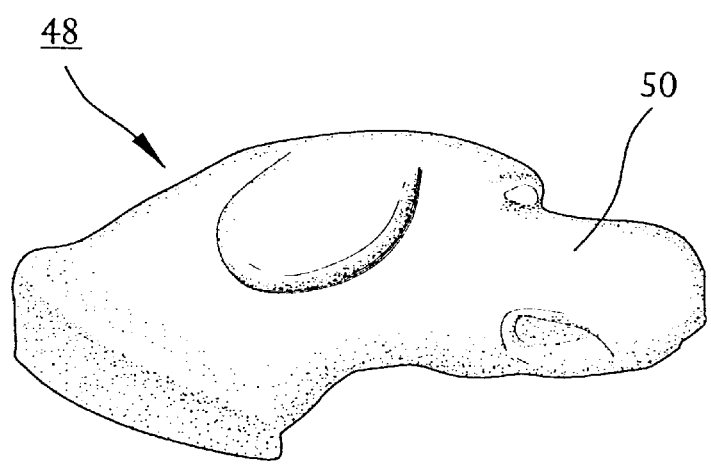
FIG. 13 is a perspective view of a metal insert after trimming.

Referring to FIG. 13, once the metal insert 48 (made by the die-stamp method) is trimmed in the cut stamp, those of good quality are painted on the convex surface 50. Inserts 48 made by casting methods may need no trimming, though some cosmetic work may need to be done before painting. In the presently preferred method, the painting is done by hand, but it may be possible to adapt machine control to the painting task. Therefore, machine control for the painting task is within the scope of the method of the invention. The artistic paint design is that created by the computer graphic artist after scanning the original image and tidying it for use as the reference image 10.

Figure 14:
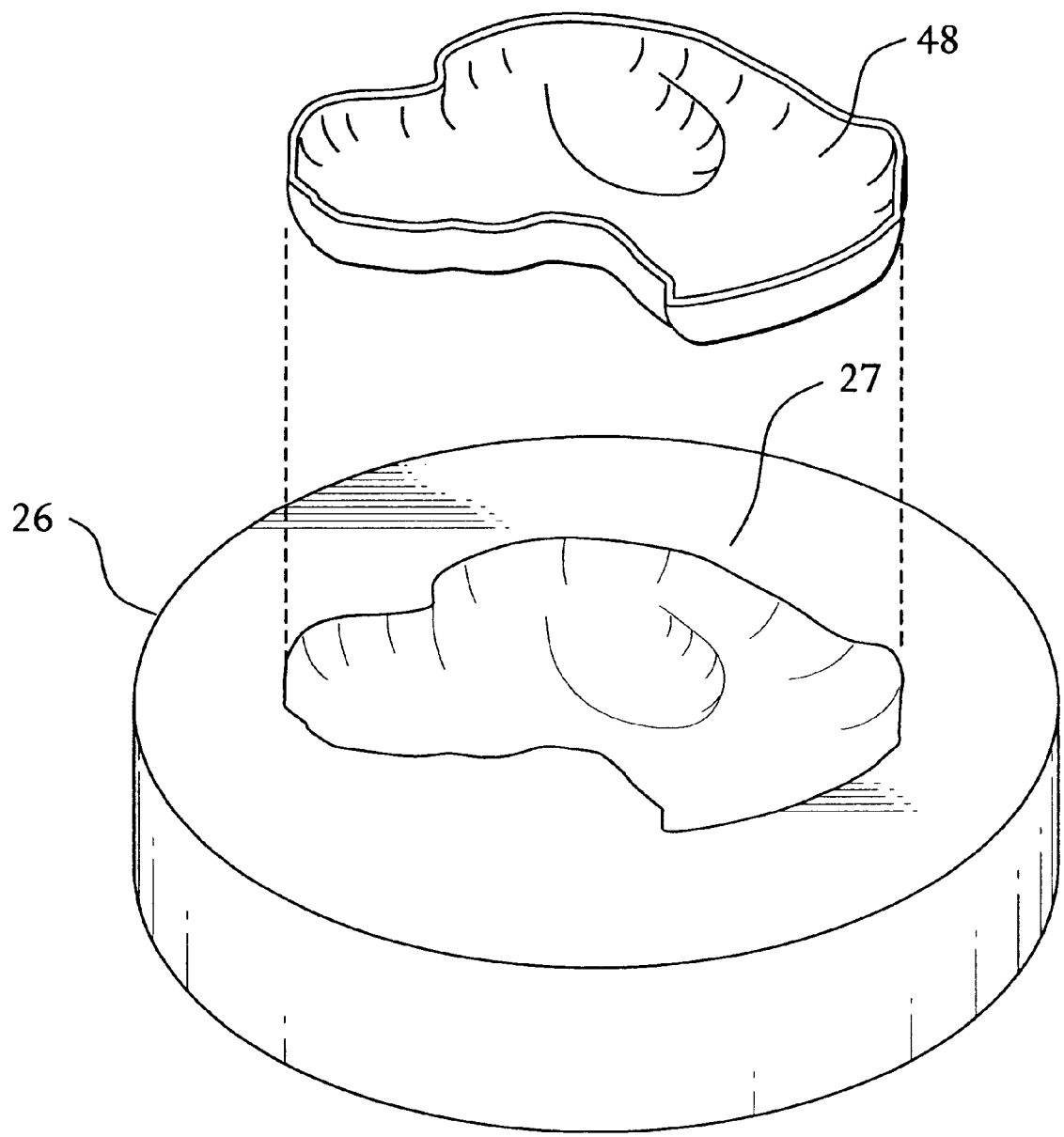
FIG. 14 is a perspective view of a cabochon with the metal insert aligned for assembly.
Figure 15:
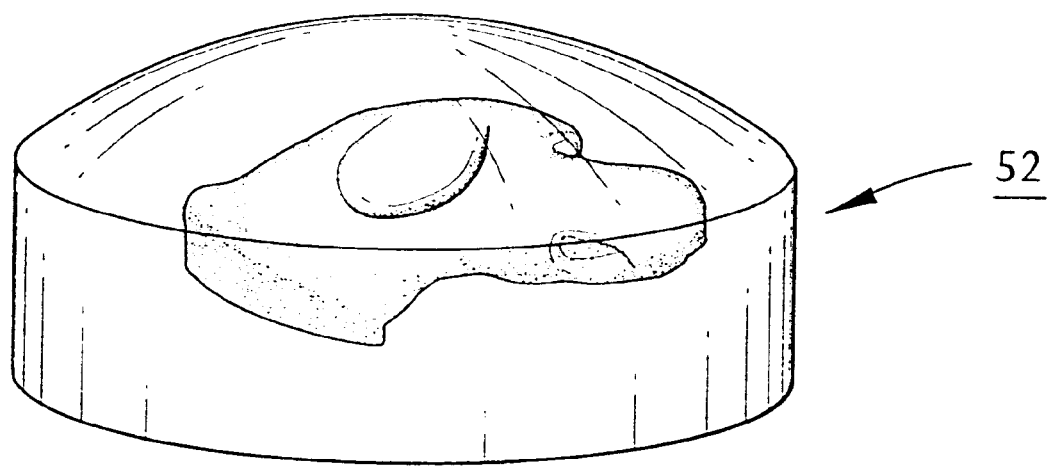
FIG. 15 is a perspective view of the assembled intaglio made according to the invention.

Referring to FIG. 14, after painting, the metal insert 48 is ready for mating with the cabochon 26. The painted metal male insert 48 is fitted into the female recess 27 milled into the cabochon in an earlier step. Once a good fit is assured, the insert is secured in place with a transparent adhesive. The adhesive must be transparent because it is applied to the painted surface, which is the surface that is intended to be visible through the clear cabochon. Referring to FIG. 15, the assembled intaglio 52 gives the appearance that the image was painted by eglomise; that is, painted in reverse on a three dimensional surface inside the cabochon.

Figure 16:
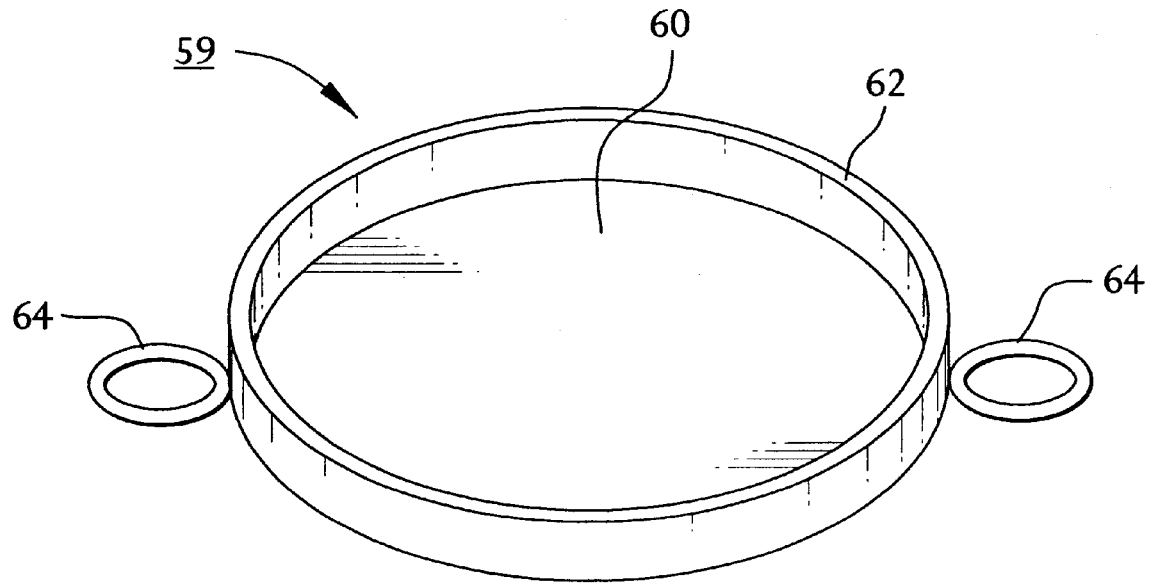
FIG. 16 is a perspective view of a bezel for mounting the intaglio.

It is advisable to insert the assembled intaglio 52 into a setting or carrier to protect the hollowed recess on the reverse side of the stone, and the insert, from damage. To employ the intaglio as a jewelry item, one of the objects of the described method, a bezel setting of precious or semi-precious metal is created. Some suggested metals are gold, sterling silver, or gold filled material. The bezel setting 59 for the described intaglio is illustrated in FIG. 16. It has a flat metal pan 60 with a raised metal rim 62 that grips the edge of the cabochon.

To fabricate the bezel 59, a press operator cuts out a disk of the desired metal in the correct size for encasing the intaglio. A custom tool is employed for forming the bezel in the press. What will be the outer surface of the bezel may be stamped with a trademark, a logo or other designation for identification.

The bezel may be customized by traditional jewelry making processes to be incorporated into a jewelry item. For example, for the small intaglio described, two small rings 64 (FIG. 16) may be attached to the bezel to attach the intaglio to a charm bracelet. Alternatively, a single ring may be provided to attach the intaglio to a neck chain. Several other uses, and several other custom additions, are possible.

Figure 17:
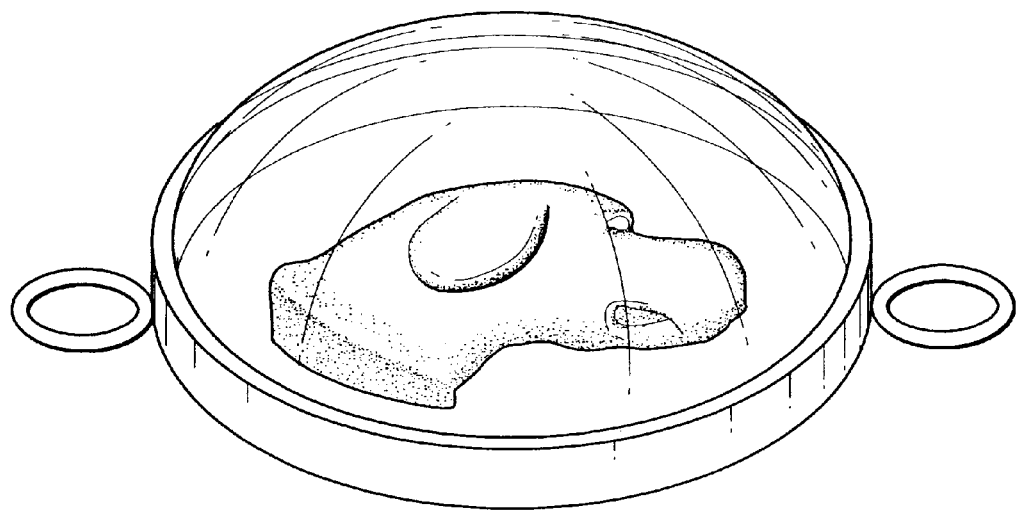
FIG. 17 is a perspective view of the assembled jewelry item made by the method of the present invention.

After the bezel is fitted with the desired alterations, the intaglio is placed and secured in the bezel (or other setting or protective device). See FIG. 17. For enhancement of the intaglio's appearance, a wafer of mother-of-pearl, or any other suitably decorative stone or substance, may be placed in the bezel beneath the intaglio. It will be visible through the cabochon around the painted insert inside. The finished intaglio is incorporated into a piece of jewelry or otherwise put to use as a decorative item.

As a decorative item, an intaglio made according to the present invention may be displayed in several ornamental surroundings. For example, one or more intaglios may be mounted in an ornamental block of wood or marble, or other suitable substance, for a desktop display. Intaglios made according to the invention can be used in a variety of decorative and ornamental ways too numerous to name. Provided that the intaglio is made according to the method described above or an equivalent, with or without the bezel setting, intaglios made for such purposes are within the scope of the present invention.

The present invention may be embodied in other specific forms without departing from the spirit or essential attributes thereof and, accordingly, reference should be made to the appended claims, rather than to the foregoing specification, as indicating the scope of the invention.

We claim:

1. A method for making a decorative item comprising the steps:

creating a digital representation of a two-dimensional image;

generating a three-dimensional contour profile for the image in digital format;

scaling the three-dimensional profile for the production of a first and a mating second reproduction of the image in three dimensions;

milling into a cabochon the scaled three-dimensional profile of the first image reproduction, said milled first image reproduction forming a recessed three-dimensional concave surface within the cabochon;

making an insert in the form of the scaled second reproduction of the image, said insert having a three-dimensional convex surface;

painting the insert on the convex surface; and, securing the painted insert into the recess milled into the cabochon such that the painted three-dimensional image is visible within the cabochon.

2. The method of claim 1, further comprising the step:

mounting the cabochon into a jewelry setting.

3. A method for making a decorative item comprising the steps:

creating a digital representation of a two-dimensional image;

generating a three-dimensional contour profile for the image in digital format;

scaling the three-dimensional profile of the image for the production of a first and a mating second reproduction of the image in three dimensions, the images being scaled such that an insert made in the form of the second image may fit within and conform to the size and detail of a recess made in the form of the first image;

generating a computer numerical control toolpath dataset for each of the respective first and second scaled image reproductions, each toolpath dataset respectively being employed for controlling the machining of each of the respective first and second reproductions of the image by a computer-controlled milling machine;

milling into a cabochon the scaled three-dimensional profile of the first image reproduction, said milled first image reproduction forming a three-dimensional concave recessed surface within the cabochon;

making an insert in the form of the scaled second reproduction of the image, said insert having a three-dimensional convex surface;

painting the insert on the convex surface of the insert;

fitting the painted insert into the recess in the underside of the cabochon, mating the three-dimensional detail of the insert into the three-dimensional detail of the recessed surface within the cabochon, and securing the painted insert into the recessed surface within the cabochon.

4. The method of claim 3, wherein the method further comprises the step:

mounting the cabochon in a jewelry setting.

5. The method of claim 3, wherein the step of generating a three-dimensional contour profile of the image is performed using CADCAM tools.

6. The method of claim 3, wherein the step of making an insert comprises the steps:

milling a die stamp tool under computer control, employing the computer numerical control toolpath dataset for the three-dimensional second image reproduction to control the milling operation, producing a die stamp having a reproduction of the second image milled into it; and, using the die stamp tool, stamping the three-dimensional second image into a metal disk to make the insert.

7. The method of claim 3, wherein the step of making an insert comprises the steps:

making a master mold of the recess milled into the cabochon, casting a master insert from the mold, fabricating production molds from the master insert, and casting production inserts using the production molds.

8. A method for making a decorative item comprising the steps:

creating a digital representation of a two-dimensional image;

generating a three-dimensional contour profile for the image in digital format;

scaling the three-dimensional profile of the image for the production of a first and a mating second reproduction of the image in three dimensions;

milling into a cabochon the scaled three-dimensional profile of the first image reproduction, said milled first image reproduction forming a recessed three-dimensional concave surface within the cabochon;

milling a blank die stamp tool to produce a die stamp tool having a reproduction of the second image;

using the die stamp tool, die stamping an insert in the form of the second reproduction of the image, said second reproduction of the image on the insert having a three-dimensional convex surface;

painting the insert on the convex surface; and, securing the painted insert into the recess milled into the cabochon such that the painted three-dimensional image is visible within the cabochon.

9. The method of claim 8, wherein the method further comprises the step:

mounting the cabochon in a jewelry setting.

10. The method of claim 8, wherein the step of die stamping an insert produces a metal insert having a flashing attached to the reproduction of the male image, the method further comprises the steps:

making a cut stamp tool for removing the flashing from the insert;

placing the insert with flashing in the cut stamp tool; and pressing the insert through the cut stamp tool to remove the flashing.

11. The method of claim 10, wherein the step of making a cut stamp tool comprises the steps:
   creating an outline of the original two-dimensional image in digital format;
   sizing the outline for making first and second reproductions of the outlined image in a milling machine, wherein the second image is slightly larger than the first image;
   generating a computer numerical control toolpath data set for each of the first and second image outlines;
   milling by computer numerical control the outline of the first image reproduction into a first cut stamp tool, leaving an outline of the image in relief on the tool end;
   milling by computer numerical control the outline of the second image into a second cut stamp tool, wherein material is milled out of the surface of the second tool leaving a hole in the shape of the second image outline.

12. A method for making a decorative item comprising the steps:
   creating a digital representation of a two-dimensional image;
   generating a three-dimensional contour profile for the image in digital format using CADCAM tools;
   scaling the three-dimensional profile to an appropriate size for the fabrication of a reproduction of the image in three-dimensions;
   milling into a cabochon the scaled three-dimensional profile of the image, said milled image forming a three-dimensional concave surface within the cabochon;
   making a mold and casting an insert in the form of the scaled three-dimensional reproduction of the image, said insert having a three-dimensional convex surface;
   painting the insert on the convex surface of the male image;
   securing the painted insert into the female reproduction milled into the cabochon such that the painted three-dimensional image is visible within the cabochon.

13. The method of claim 12, wherein the step of making a mold and casting an insert comprises the steps:
   making a master mold of the recess milled into the cabochon,
   casting a master insert from the mold,
   fabricating production molds from the master insert and casting production inserts using the production molds.

14. The method of claim 12, further comprising the step:
   polishing the concave recessed surface of the image milled into the cabochon before assembly with the insert.

15. The method of claim 14, wherein the step of polishing the recessed surface milled into the cabochon comprises the steps:
   applying a series of ever-finer grit diamond grit pastes to the recessed surface and polishing the surface with a rotating polishing tool;
   spraying a clear acrylic liquid on the polished surface.

16. A method for making a decorative item comprising the steps:
   digitally scanning a two-dimensional graphic image into a computer storage medium to convert said image to digital format;
   generating a three-dimensional contour profile for the image in digital format;
   scaling the three-dimensional profile for the production of a first and a mating second reproduction of the image in three-dimensions;
   milling into a cabochon the scaled three-dimensional profile of the first image reproduction, said milled first image reproduction forming a recessed three-dimensional concave surface within the cabochon;
   making an insert in the form of the scaled second reproduction of the image, said insert having a three-dimensional convex surface;
   painting the insert on the convex surface;
   securing the painted insert into the recess milled into the cabochon such that the painted three-dimensional image is visible within the cabochon.

17. A method for making an intaglio jewelry item comprising the steps:
   creating a digital representation of a two-dimensional image;
   generating a three-dimensional contour profile for the image in digital format;
   scaling the three-dimensional profile for the production of a first and a mating second reproduction of the image in three dimensions;
   milling into a cabochon the scaled three-dimensional profile of the first image reproduction, said milled first image reproduction forming a recessed three-dimensional concave surface within the cabochon;
   making an insert in the form of the scaled second reproduction of the image, said insert having a three-dimensional convex surface;
   painting the insert on the convex surface;
   securing the painted insert into the recess milled into the cabochon such that the painted three-dimensional image is visible within the cabochon; and
   mounting the intaglio in a jewelry setting.

18. A method for making a decorative item comprising the steps:
   creating a first digital representation of a two-dimensional image;
   generating a first three-dimensional contour profile for the image in digital format;
   scaling the digital representation of the two-dimensional image to produce a second image slightly smaller than the first,
   generating a second three-dimensional contour profile for the production second three-dimensional reproduction of the image that is sized for mating together with the first three-dimensional image;
   milling into a cabochon the scaled three-dimensional profile of the first image reproduction, said milled first image reproduction forming a recessed three-dimensional concave surface within the cabochon;
   making an insert in the form of the scaled second reproduction of the image, said insert having a three-dimensional convex surface;
   painting the insert on the convex surface; and,
   securing the painted insert into the recess milled into the cabochon such that the painted three-dimensional image is visible within the cabochon.

19. The method of claim 18, further comprising the step:
   mounting the cabochon into a jewelry setting.

* * * * *